United States Patent [19]

Murphy

[11] Patent Number: 4,834,828

[45] Date of Patent: May 30, 1989

[54] MACHINE FOR WELDING ROOF MEMBRANES

[75] Inventor: Colin R. R. Murphy, Morristown, N.J.

[73] Assignee: Engineered Construction Components, Panama, Panama

[21] Appl. No.: 44,331

[22] Filed: Apr. 30, 1987

[51] Int. Cl.⁴ .......................... B32B 35/00; B44C 7/06
[52] U.S. Cl. .................................. 156/359; 156/378; 156/497; 156/499; 156/544; 156/574; 156/579
[58] Field of Search ............... 156/497, 499, 574, 579, 156/553, 391, 544, 82, 359

[56] References Cited

U.S. PATENT DOCUMENTS

| | | | |
|---|---|---|---|
| 3,829,338 | 8/1974 | Hayasi et al. | 156/359 |
| 4,146,419 | 3/1979 | Neidhart | 156/499 |
| 4,259,142 | 3/1981 | Kortepeter | 156/574 |
| 4,354,893 | 10/1982 | Kugler et al. | 156/497 |
| 4,440,588 | 4/1984 | Stevenson et al. | 156/497 |
| 4,504,352 | 3/1985 | Meyer | 156/574 |
| 4,725,328 | 2/1988 | Arnold | 156/497 |
| 4,737,213 | 4/1988 | Paeglis et al. | 156/499 |

Primary Examiner—Michael Wityshyn
Attorney, Agent, or Firm—Elliot M. Olstein; Raymond J. Lillie

[57] ABSTRACT

A device for welding portions of two overlapping roof membranes wherein a fastening means has been fastened to the lower of the two membranes and wherein there are portions of both overlapping membranes on both sides of the fastening means. The device includes a welding means which can apply welds to the membranes on both sides of the fastening means simultaneously. The welding means includes a nozzle having two outlets, with each outlet applying a heat sealing weld on one side of the fastening means. The device also includes a pair of weighted stitcher wheel assemblies which help to eliminate air pockets for underneath the roof membranes and to maintain the proper alignment of the overlapping membranes. The invention also includes a welding process using the above-mentioned device.

9 Claims, 6 Drawing Sheets

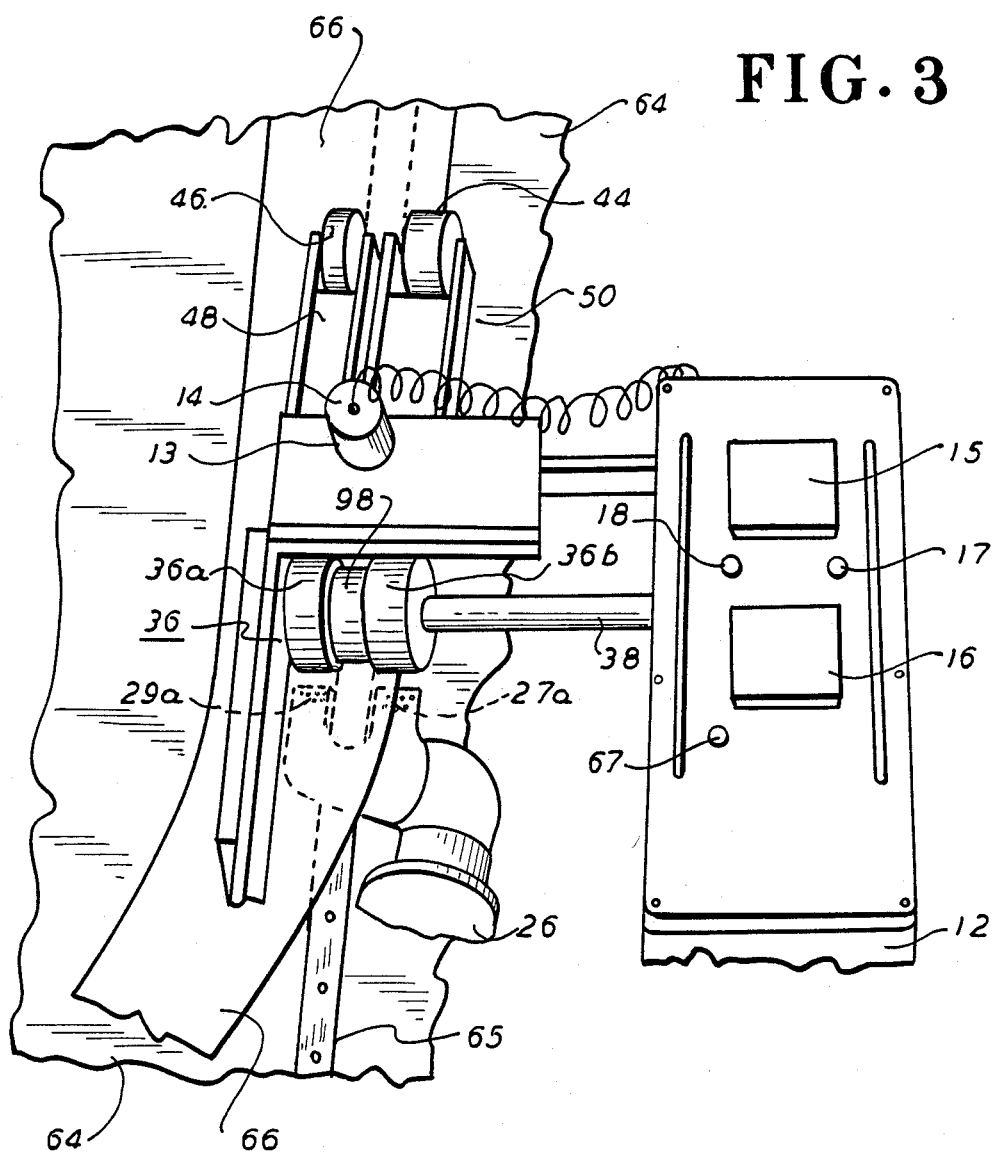
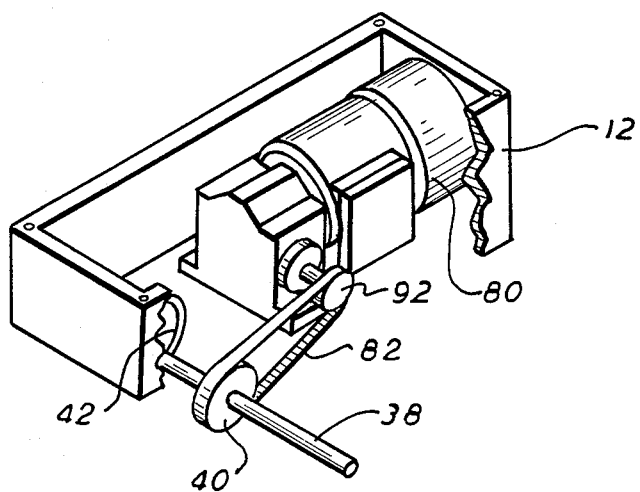
FIG. 3
FIG. 4

MACHINE FOR WELDING ROOF MEMBRANES

This invention relates to a machine for applying welds to roof membranes. More particularly, this invention relates to a machine for applying welds to the overlapping portions of two overlapping roof membranes.

In a typical process for laying membranes on a roof deck, a first mmbrane is laid on a portion of the roof deck. After the membrane is laid, a fastening means such as a batten bar or a line of stress plates is placed near the edge of the membrane. The batten bar, line of stress plates, or other fastening means is parallel to the edge and runs parallel to the edge for the entire length of the edge. The batten bar or each stress plate in a line of stress plates, or other fastening means is secured to the roof membranes by inserting fasteners through the batten bar or stress plates, or other fastening meeans, and the membrane, and into or through the roof deck. Then another membrane is laid on the roof deck. A small portion of this second membrane overlaps the area where the batten bar, line of stress plates, or other fastening means was laid on the first membrane. The overlapping edge area of the second membrane overlaps an area of the first membrane on both sides of the batten bar, line of stress plates, or other fastening means. A weld is then applied between the lower first membrane and the upper second membrane on one side of the batten bar, line of stress plates, or other fastening means and then another weld is applied between the two membranes on the other side of the batten bar, line of stress plates, or other fastening means. This results in the fusion of the two membranes on both sides of the batten bar, line of stress plates, or other fastening means, thus providing a secure weld of the membranes. The welds are applied by a welding tool having a heating element which forms a weld by heat sealing the membranes together.

This process, as currently carried out, does have disadvantages. One disadvantage is that one must apply a weld on one side of the fastening means and then apply a weld on the other side of the fastening means. In addition, in some instances there may be insufficient heat supplied to the welding portion of the welding machine or tool, thus providing an inadequate heat seal or no heat seal. If too much heat is applied, the membranes could become melted through completely, thus rendering them unsuitable for use as roofing material and requiring removal and replacement of the membranes. Also, the membranes may not be pressed too firmly in some areas against the roof deck during welding, thus resulting in undesirable bumps or air pockets in the roofing structure. These bumps or air pockets, also known as "bubbling", are caused when there is moisture on or between the membranes being welded together. When the welding tool applies heat, whether from hot air emitted from the welding tool or from another means, the moisture tends to turn into gas. The gas, which remains heated for a short time after the welds are applied, expands, thereby creating "bubbles" between the two membranes if the membranes are not pressed together firmly immediately after welding. Iit is therefore the object of the present invention to provide a welding machine and a welding process using a machine which eliminates these disadvantages.

In accordance with one aspect of the present invention there is provided an apparatus for welding roof membranes comprising a chassis, means for movably supporting said chassis, and means for heat welding two overlapping roof membranes to each other wherein a fastening means, e.g., a batten bar or line of stress plates, is located between said overlapping roof membranes, and said welding means being capable of applying welds to the roof membranes simultaneously on both sides of said fastening means.

In accordance with another aspect of the present invention there is provided an apparatus for welding roof membranes which comprises a chassis, means for rollably supporting and moving said chassis, a welding means, and means for pressing overlapping roof membranes against a roof after welds are applied, said pressing means comprising a bifurcated weld wheel located in front of said welding means, said wheel having a groove, and said weld wheel being capable of being positioned over a portion of the upper membrane resting over fastening means, e.g., a batten bar or a line of stress plates, for the lower membrane, and each portion of said weld wheel on opposite sides of said groove being positioned on opposite sides of said fastening means. In addition, the means for pressing overlapping roof membranes against a roof after welds are applied may further comprise a pair of wheels, located in front of said weld wheel, each of said wheels capable of being positioned on opposite sides of a fastening means for the bottom membrane of the overlapping membranes, two pairs of brackets, with each pair of brackets corresponding to one of said wheels and bolted at one end to opposite sides of said wheel, and weight means affixed between each pair of brackets. In a preferred embodiment, the welding means comprises a nozzle for directing heated gas against said roof membranes for heat welds wherein said nozzle includes first and second spaced outlet means for directing heated gas on opposite sides of a fastening means for the roof membrane. The welding means may further comprise a blower, a heating element, and a holder for said heating element. Said device may also comprise a means for detecting the deck temperature of the welded membranes immediately after welding comprising an infrared sensor, a holder for said infrared sensor, and a temperature readout meter connected to said infrared sensor. The device may also include a motor contained within a motor housing mounted to said chassis, and a handle portion which includes means for starting and stopping said motor and means for controlling the speed of said motor.

Applicant's invention also includes a process wherein a fastening means is fastened to a first roof membrane and a roof near the edge of the first roof membrane, another roof membrane is placed so as to overlap a portion of said first membrane as well as overlapping said fastening means, and welds are applied to said membranes on opposite sides of said fastening means whereby said membranes are welded to each other, the improvement comprising applying welds to said membranes on opposite sides of said fastening means simultaneously. The process, in a preferred embodiment, includes applying the welds simultaneously with a welding means having a nozzle with two prongs, each of said prongs being positioned on opposite sides of said fastening means and applying a weld on each side of said fastening means.

FIG. 3 is an elevated view of the front of the device as it applies to two overlapping roof membranes;

FIG. 4 is a cut-away view of the motor device, said motor being contained within a housing;

Figure 1:
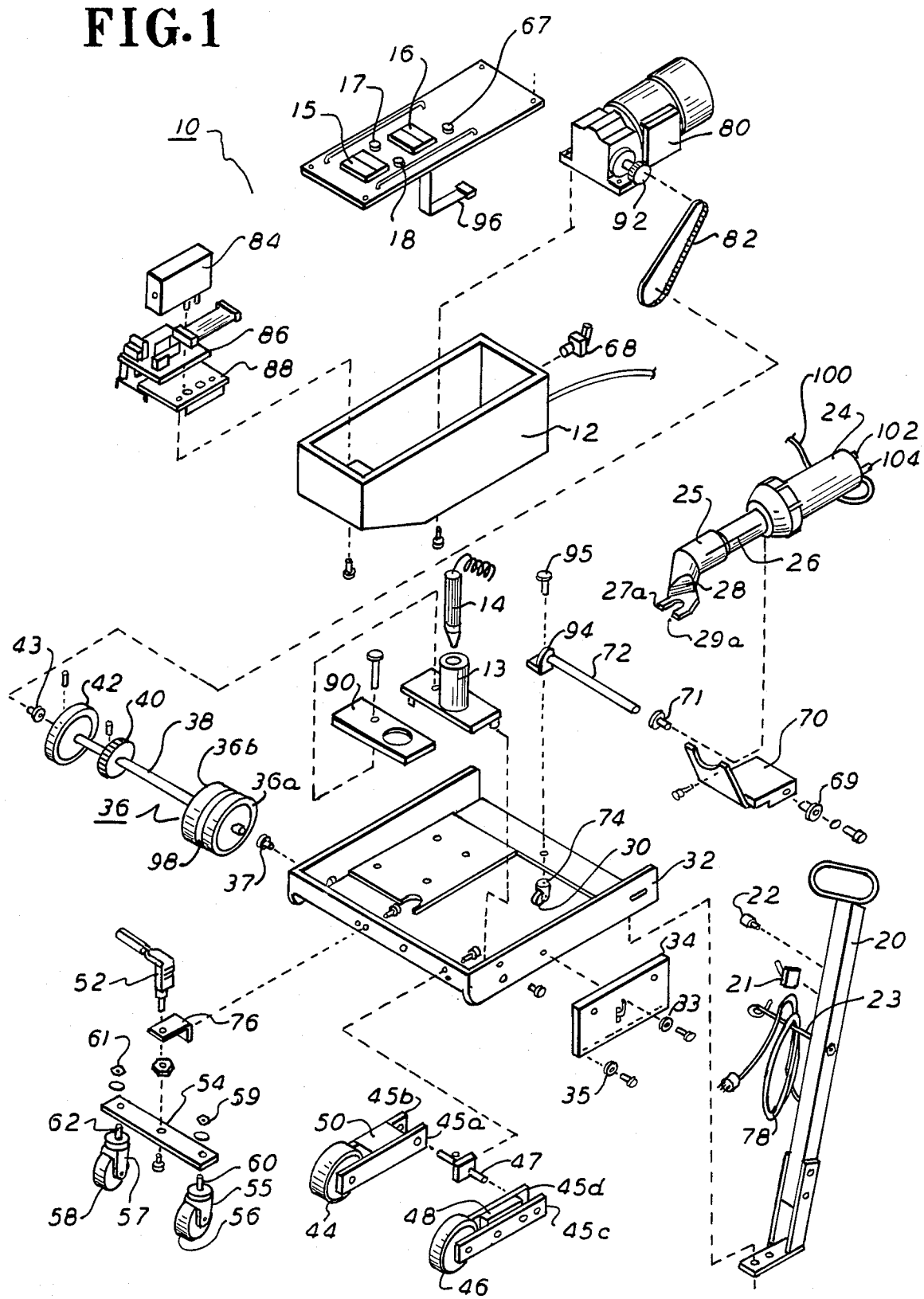
FIG. 1 is an exploded view of an embodiment of the roof welding device of the present invention.
Figure 2:
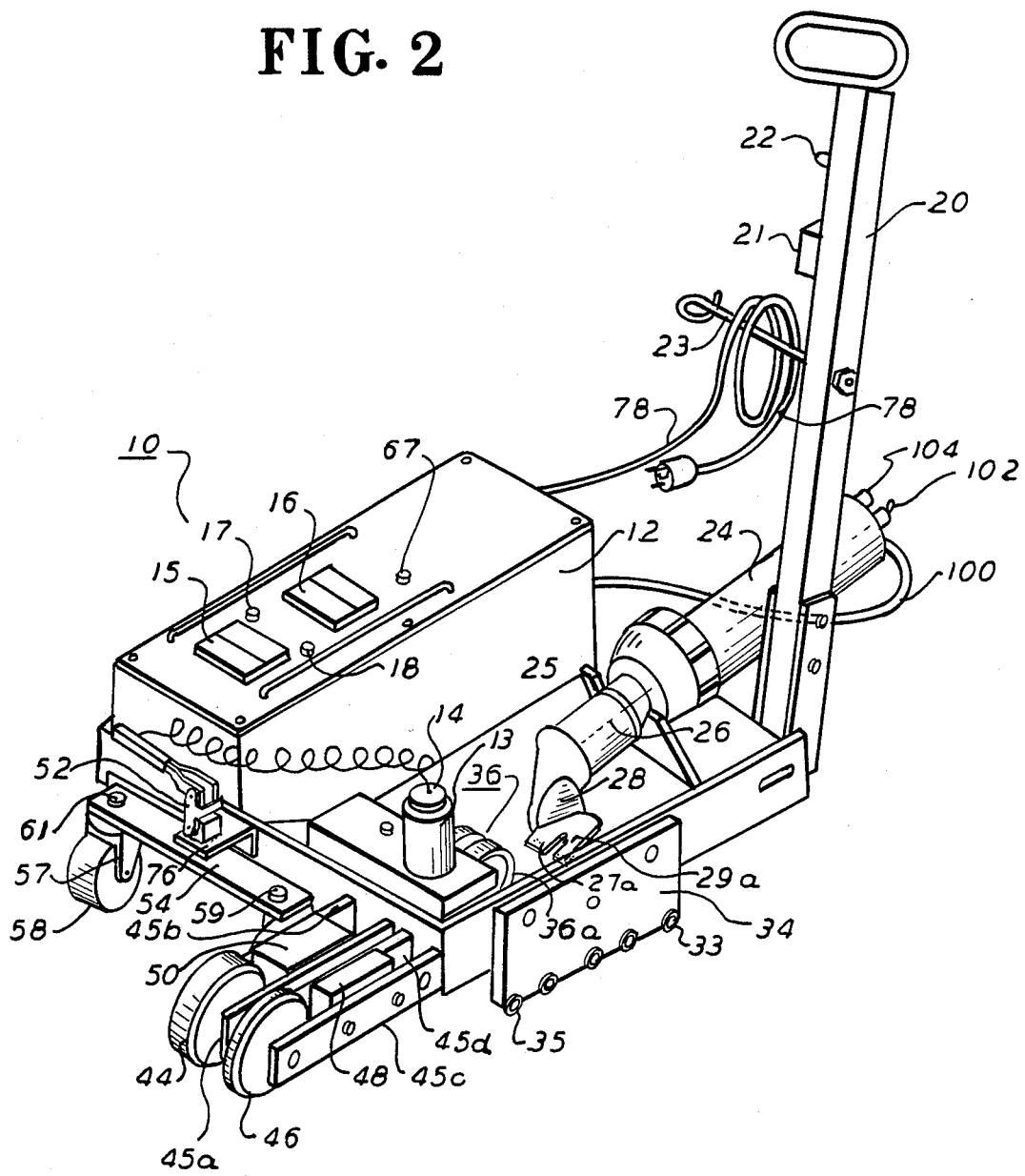
FIG. 2 is a left side elevational view of an assembled device.
Figure 5:
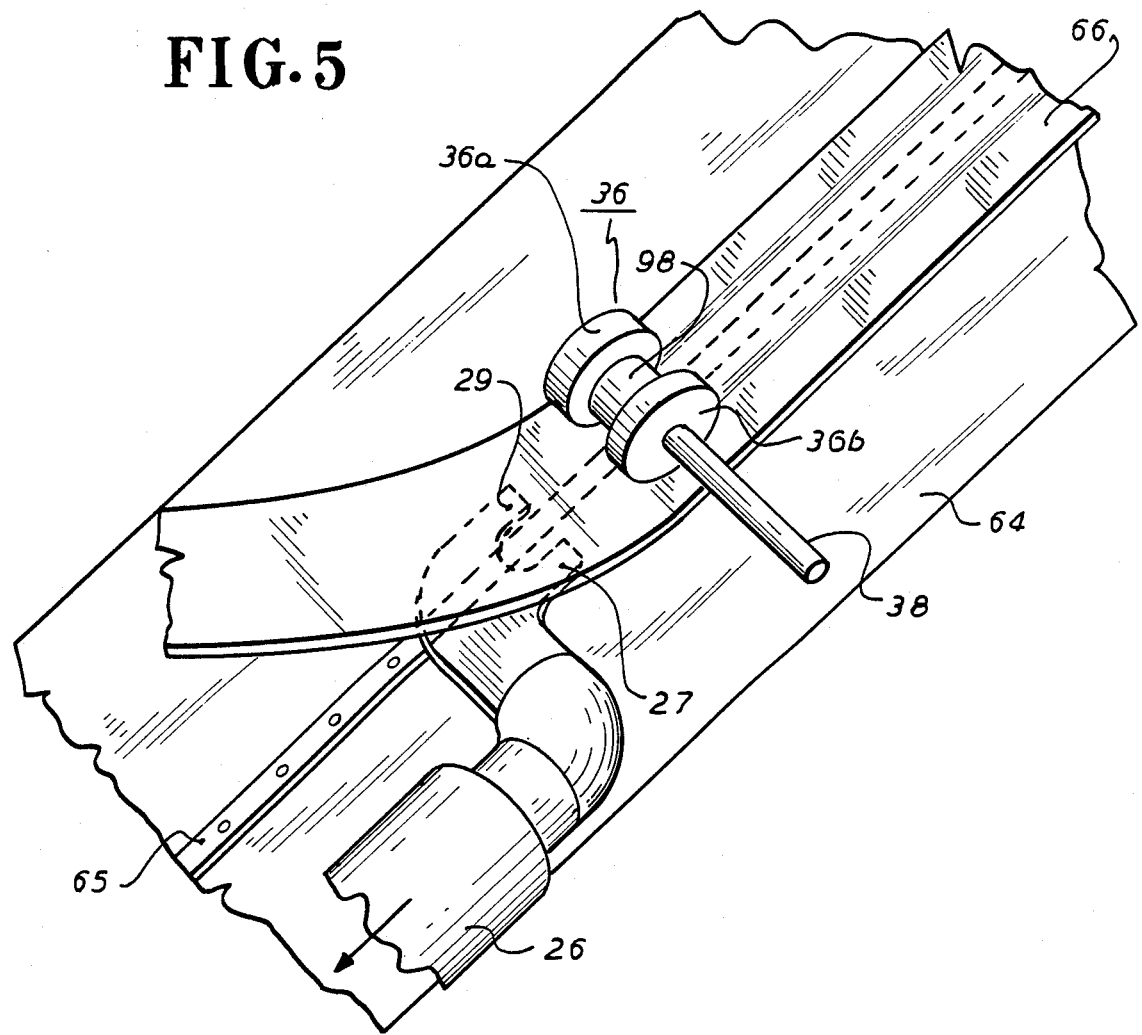
FIG. 5 is an elevated view of the welding means and the weld wheel as welds are being applied to two overlapping roof membranes.
Figure 6:
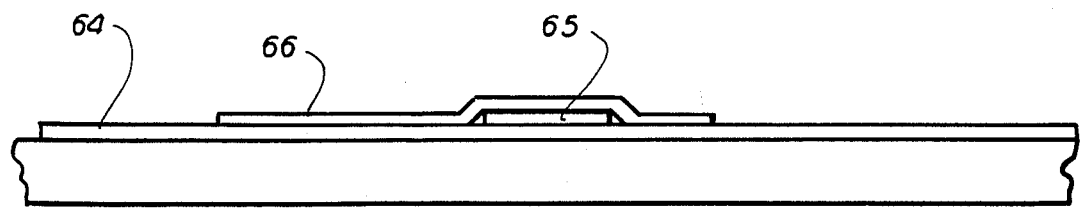
FIG. 6 is a cut-away view of two welded roof membranes after welds were applied to the membranes on both sides of a batten bar or line of stress plates.
Figure 7:
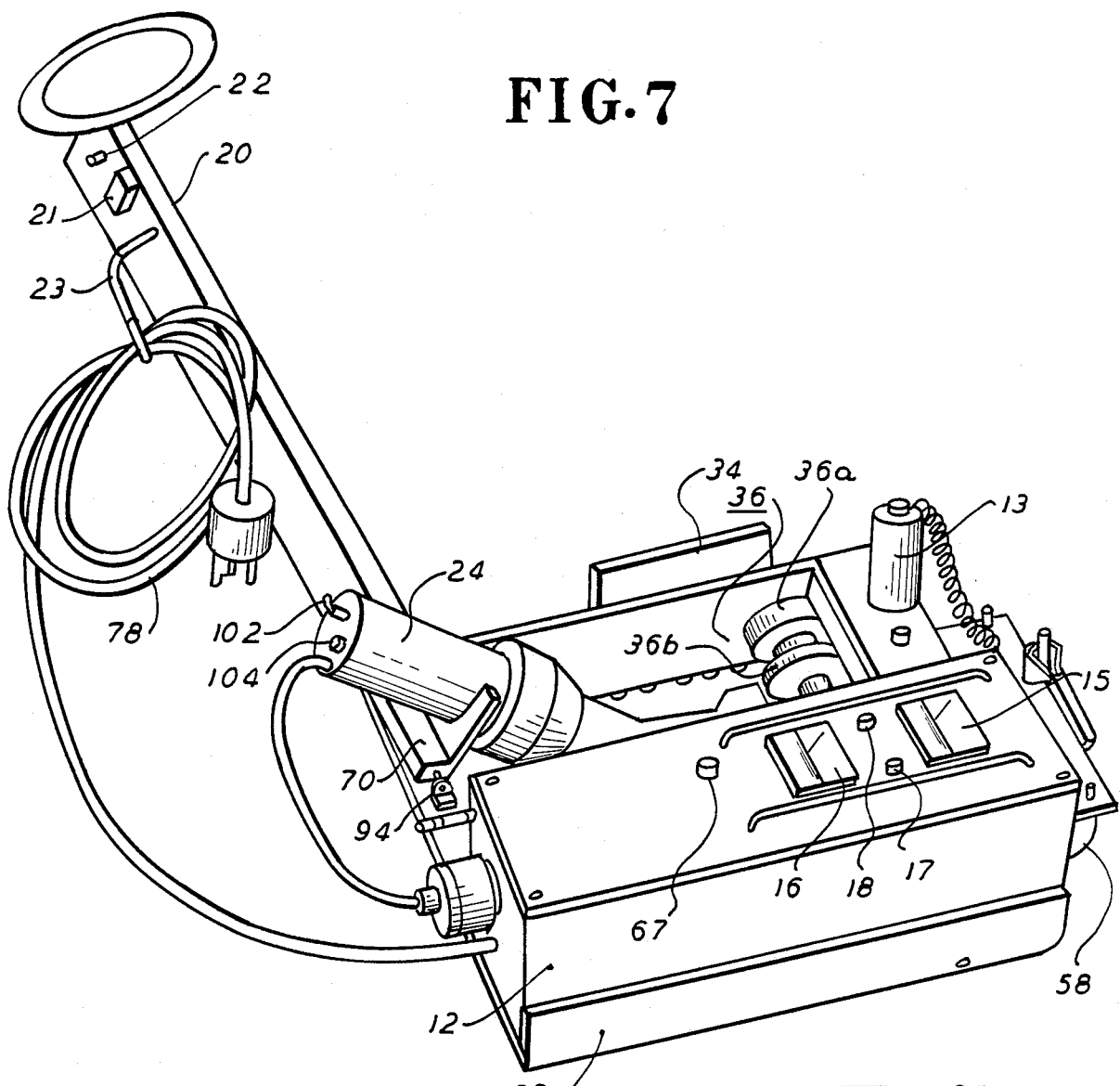
FIG. 7 is a right side elevational view of the device.
Figure 8:
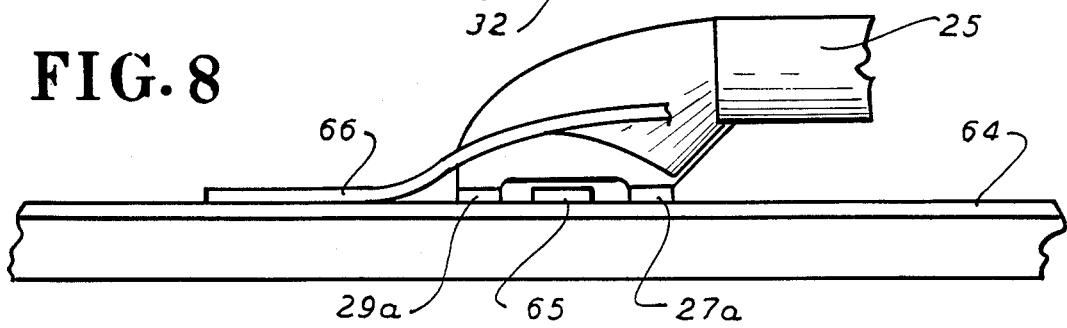
FIG. 8 is a front view of the nozzle of the device as it applies welds to two overlapping roof membranes on both sides of a batten bar.
Figure 9:
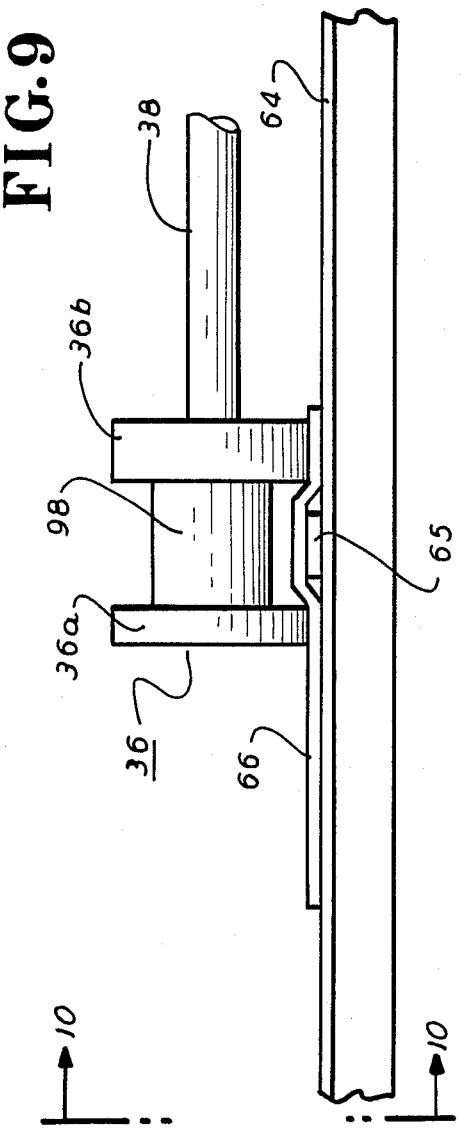
FIG. 9 is a front view of the weld wheel of the device as it rools over the upper of two overlapping roof membranes.
Figure 10:
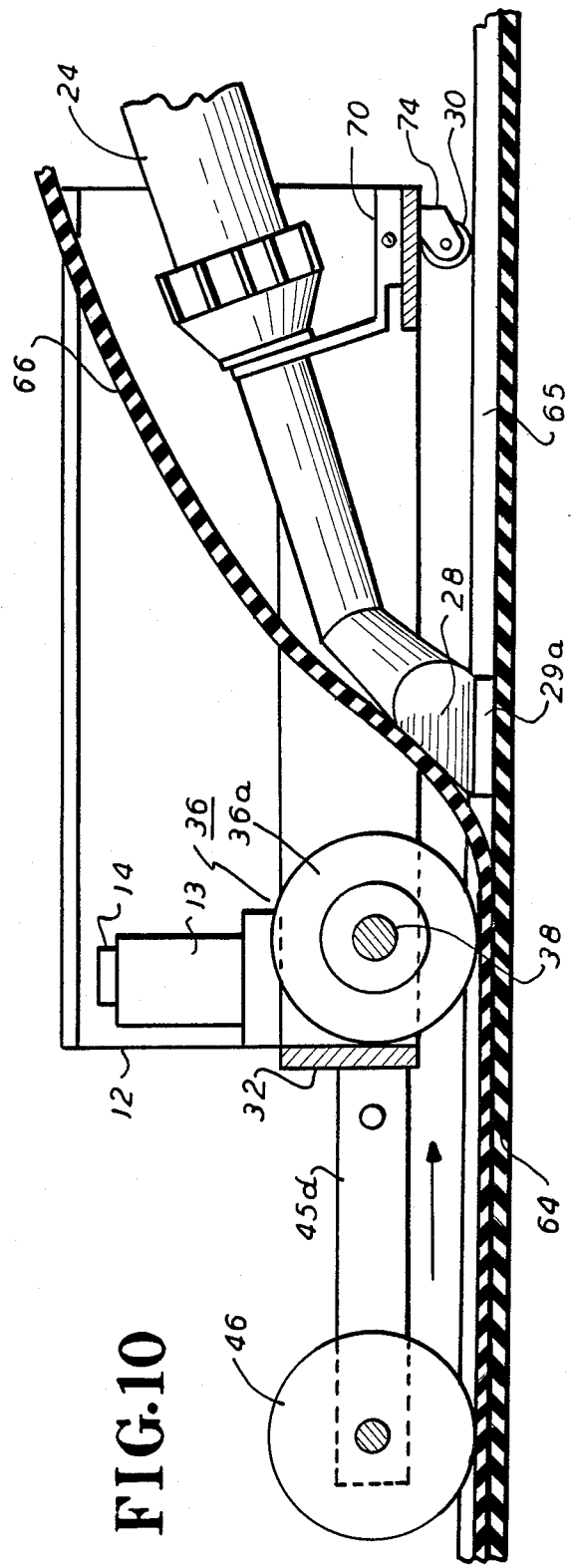
FIG. 10 is a left side view of the device as it applies welds to two overlapping roof membranes.

Referring now to the drawings, there is shown an embodiment of a welding device 10 of the present invention having a handle assembly 20 which includes a cord holder 23, a start/stop switch 21, and a speed control knob 22 for a walker motor 80 contained in a motor housing 12. The motor 80, as well as the entire device 10, is activated by power switch 68 on housing 12. Next to the housing 12 is an infrared probe 14 contained in a probe holder 13. A weight set 90 may also be mounted on probe holder 13. The probe 14 is electronically connected to a temperature readout meter 15 mounted on the top of said housing 12. Also mounted on the top of said housing 12 is a voltage meter 16, a high voltage indicator 17, a low voltage indicator 18, and a reset knob 67. The motor housing 12 may also contain an electrical control and monitoring system comprising an infrared control box 84, a control means 86, and a circuit board 88, which insures that the proper amount of current i supplied to the device 10. This electrical control and monitoring system is connected to the temperature readout meter 15, voltage meter 16, and voltage indicators 17 and 18, by means of wiring 96, which is connected to control means 86. The electrical control and monitoring system also controls the motor 80, and the welding means. The housing 12, handle assembly 20, and probe holder 13 are each mounted to the chassis 32.

Also mounted to chassis 32 is a welding tool comprising a blower 24, a heating element 26 contained within a heating element holder 25, and a nozzle 28 which transfers heat from heating element 26, thereby applying welds to the roof membranes. The welding tool has a cord 100 which connects blower 24 to motor housing 12. The blower 24 has a switch 102 which activates the blower 24. The amount of heat emitted by heating element 26 is controlled by control means 104, which may be a thermostat, rheostat, or a potentiometer. A preferred heating element comprises a coil enclosed within a ceramic material, and has a wattage of about 3,000 watts. The welding tool is attached to the chassis 32 by means of a welder cradle 70 for holding the tool, an axle 72 and axle bushings 69, 71 disposed within said cradle 70, and an axle bracket 94 and screws 93, 95 bolted to said chassis 32.

Nozzle 28 is bifurcated into two spaced outlets 27, 29, said outlets having openings 27a, 29a. Each of these outlets transfers or directs gas such as air heated by heating element 26 throgh openings 27a, 29a against the roof membranes, thus applying heat welds to the roof membranes. This feature of the nozzle 28 enables two welds to be made on the roof membranes simultaneously.

Connected near the front of the chassis 32 is an axle 38 upon which are mounted weld wheel 36, axle gear 40, and drive wheel 42. The axle is mounted to chassis 32 by bushings 37, 43. Drive wheel 42 is connected to the motor 80 by a driving means such as a drive belt 82 which is connected to a drive gear 92 of motor 80. The drive wheel 42 is located under the motor housing 12. Weld wheel 36 is located in front of the outlets 27, 29 of nozzle 28 and helps to press the two membranes being welded firmly against the roof deck and against each other after the welds have been applied. Weld wheel 36 has a groove 98 which bifurcates the wheel into two portions 36a, 36b. In a preferred embodiment, weld wheel 36 is located 1/32 inch away fron the ends of outlets 27,29. As a further aid in keeping as much pressure on the roof membranes as possible, a weight 34 is affixed to one side of chassis 32. Wheels 33, 35 are bolted to weight 34 by screws or other bolting means.

Wheels are provided at the front and rear of the chassis 32 in order to move the welding device 10 along a roof membrane. At the rear of the chassis 32 is a wheel 30 mounted to chassis 32 by means of a bracket 74. In front of the chassis is a riser assembly mechanism comprising a lever 52 which is screwably inserted into a bracket 76 and a plate 54. Depending from plate 54 are rise wheels 56, 58, mounted to plate 54 by bracket 55, screws 60, and nut 59, and by bracket 57, screw 62, and nut 61, respectively. The riser assembly mechanism is mounted to chassis 32 by means of bracket 76.

Also connected to the front of the chassis 32 is a stitcher wheel assembly. This assembly, also located in front of weld wheel 36, comprises a wide stitcher wheel 44 and a narrow stitcher wheel 46. Mounted to wide stitcher wheel 44 are brackets 45a, 45b, and mounted to narrow stitcher wheel 46 are brackets 45c, 45d. Stitcher wheel axle 47 connects bracket 45a, 45b, 45c, 45d and serves to mount the stitcher wheel assembly to chassis 32. Mounted between brackets 45a, 45b is weight 50, and mounted between brackets 45c, 45d is weight 48. Weights 48, 50 provide weighted stitcher wheels 44, 46 to press firmly against the roof membranes after the welds have been applied. this helps to eliminate any "bubbling" or air pockets under the membranes and to maintain alignment of the welding seams after the welds are applied as well as proper alignment of the roof membranes.

The welding process using the device 10 is carried out by laying a bottom membrane 64 on top of a roof deck or other roofing structure. A fastening means, such as a batten bar 65, is fastened to membrane 64 and to the roof deck as known in the art. Although a batten bar is shown, other fastening means may be used; e.g., a line of stress plates. The batten bar 65 is fastened near and parallel to an edge of membrane 64 for the entire length of the edge, but does not touch the edge of membrane 64. A top membrane 66 is laid over bottom membrane 64 so as to overlap portions of membrane 64 on both sides of batten bar 65. After the two membranes 64, 66 have been laid in the above overlapping position, nozzle 28 of the welding tool including outlets 27, 29 is inserted between membranes 64, 66 so as to have outlet 27 on one side of batten bar 65 and outlet 29 on the other side of batten bar 65. The nozzle 28 and outlets 27, 29 are run between the membranes 64, 66. The outlets 27, 29 transmit or direct heated gas such as air heated by heating element 26 through openings 27a, 29a to form heat sealing welds which hold the overlapping portions of membranes 64, 66 together. One may control the amount of heat being applied to the membranes by adjusting potentiometer 104 on blower 24 or by controlling the speed of motor 80 by turning speed control knob 22. Operation of the motor 80, which propels the device 10, at a fast speed causes less heat to be applied to the membranes, while operation of the motor at a slow speed will cause more heat to be applied to the membranes. The heat output from the nozzle 28, therefore, may be controlled by the speed at which the device 10, including the nozzle 28 and outlets 27, 29, travels. Outlet 27 forms a weld on one side of batten bar 65 and outlet 29 forms a weld on the opposite side of batten bar 65. These welds are therefore applied simultaneously.

After the weld has been made and as the device 10 continues to move along the overlapping membranes, continuing the welds, weld wheel 36 and then weighted stitcher wheels 44, 46 moving along the top surface of the top membrane 66 which has just been welded to the bottom membrane 64 at the points where the welds were just made. The two portions 36a, 36b of weld wheel 36, and then stitcher wheels 44, 46, in effect straddle the batten bar 65 as they run along the top surface of the top membrane 66. Groove 98 of weld wheel 36 rolls over the portion of top membrane 66 which lies directly over batten bar 65 while portions 36a, 36b, of weld wheel 36 roll over portions of top membrane 66 on opposite sides of batten bar 65. The weld wheel 36 and the stitcher wheels 44,46, which are aided by weights 48, 50 thereby help to eliminate air pockets and "bubbling" underneath the roof membranes. These wheels also help to maintain the newly-formed weld seams in their proper position, thus maintaining the overlapping portions of membranes 64, 66 in proper alignment.

As the device 10 is being moved along the membranes 64, 66, the deck temperature of the welds being made by outlets 27, 29 is given by temperature readout meter 15. The temperature is determined from the amount of heat sensed by infrared sensor 14. The infrared sensor 14 is located in front of weld wheel 36 and senses the "deck heat" after a weld has been made. In this way one can determine if the welding is being done at the proper temperatures. Voltages of the device is indicated by voltage meter 16, and if the voltage is not proper, high voltage indicator 17 or low voltage indicator 18 will give a signal indicating that the device 10 is not operating at the proper voltage. A reset means 67 and a power switch 68 control power to the temperature sensing and voltage sensing mechanisms as well as to the motor and the welding tool. If the device 10 is operating at too high or too low a voltage, the electrical control and monitoring system through circuit board 88 will turn off power for the entire device 10. After the power is turned off, one presses the reset switch 67 in order to reactivate the device. A preferred embodiment of circuit board 88 is an OP3 circuit board, manufactured by Trinity Group Fastening Systems, Inc.

In order to start the motor after turning on the power switch 68, one turns on the motor on/off switch 21 on handle assembly 20. The speed can be controlled by turning speed control knob 22, also located on handle assembly 20. One grips handle assembly 20 while walking device 10 along the roof membranes.

Power can be supplied to the device by standard household electric current by means of cord 78, which is connected to the motor housing 12. When the device 10 is not in use, cord 78 can be wrapped around cord holder 23 for easy storage of the device 10.

Advantages of the present invention include the capability of applying welds to the membranes on both sides of the fastening means simultaneously. This means that the welding of the overlapping roof membranes can be done more efficiently using the device of the present invention. The weld wheel and weighted wheels are also more effective in pressing the overlapping membranes together after welding, thus providing for better welds which are more likely to hold the membranes together. Another convenience of this device is that the means for stopping and starting the motor is on the handle of the device. In addition, the means for detecting the deck temperature of the membranes gives a more accurate reading of the deck temperature, thus giving a more accurate determination as to whether the welds have been applied at proper temperatures.

It is to be understood that the device of the present invention as well as the welding process using this device are not limited to the specific embodiments described above. The inventions may be practiced other than as particularly described and still be within the scope of the accompanying claims.

What is claimed is:

1. A device for welding roof membranes, comprising:
   a chassis;
   means for movably supporting said chassis;
   welding means for heat welding two overlapping roof membranes to each other wherein a fastening means is located between said overlapping roof membranes, said welding means being attached to and positioned only on one side of said chassis, said welding means being capable of applying heat welds to said roof membranes simultaneously on both sides of and adjacent to a fastening means, and wherein said welding means includes a first directing means for directing heat to form a weld at one side of and adjacent to a fastening means, and a second directing means for directing heat to form a weld at another side of and adjacent to a fastening means; and means for applying pressure to welded overlapping roof membrane portions on opposite sides of and adjacent to a fastening means between the overlapping roof membrane portions, said means for applying pressure being attached to and positioned only on said one side of the chassis rearward of said welding means relative to the direction of movement of said device to provide thereby pressure to roof membrane portions only over a limited portion of the width of the chassis.

2. The device of claim 1 wherein aid welding means further comprises:
   a blower;
   a heating element; and
   a holder for said heating element, wherein said heating element in contained within said holder, said heating element and said holder being located in front of said blower and behind said first directing means and said second directing means, whereby said blower directs a gas to said heating element, whereby said gas is heated, and is subsequently directed to said first directing meand and to said second directing means.

3. The device of claim 1, and further comprising:
   a motor;

a housing for said motor, said housing mounted to said chassis; and a handle portion, said handle portion including means for starting and stopping said motor and means for controlling the speed of said motor.

4. The device of claim 1, and further comprising means for detecting the temperature of said welds, said means for detecting temperature comprising:

an infrared sensor;

a holder for said infrared sensor; and a temperature readout meter connected to said infrared sensor.

5. A device for welding overlapping roof membranes, comprising:

a chassis;

means for movably supporting said chassis;

a welding means for applying welds to overlapping roof membranes wherein a fastening means is located between said overlapping roof membranes; and means for pressing said overlapping roof membranes against a roof after said welds are applied, said pressing means attached to said chassis and comprising:

a bifurcated weld wheel located behind said welding means relative to the direction of movement of said device, said weld wheel having a groove dividing said weld wheel into first and second portions, whereby said weld wheel is capable of being positioned over a portion of an upper membrane of said overlapping membranes, with the first and second portions being positioned on opposite sides of a fastening means between overlapping membranes.

6. The device of claim 5, and further comprising:

a pair of weighted wheels located behind said weld wheel relative to the direction of movement of said device, each of said wheels capable of being positioned on opposite sides of a fastening means between said overlapping membranes.

7. The device of claim 5 wherein said welding means is capable of applying welds simultaneously on both sides of a fastening means between overlapping membranes.

8. The device of claim 7 wherein said welding means includes:

a first directing means for directing heat to form a weld at one side of a fastening means, and a second directing means for directing heat to form a weld at another side of said fastening means.

9. The device of claim 8 wherein said welding means further comprises:

a blower;

a heating element; and a holder for said heating element, wherein said heating element is contained within said holder, said heating element and said holder being located in front of said blower and behind said first directing means and said second directing means, whereby said blower directs a gas to said heating element, whereby said gas is heated, and is subsequently directed to said first directing means and to said second directing means.

* * * * *